United States Patent Office

2,823,144
Patented Feb. 11, 1958

---

2,823,144

ALUMINUM COMPLEXES AND PROCESS FOR PREPARING THE SAME

Richard L. Dalton, Wilmington, Del., assignor to E. I. du Pont de Nemours and Company, Wilmington, Del., a corporation of Delaware No Drawing. Application June 7, 1956
Serial No. 589,865

14 Claims. (Cl. 117—121)

This invention relates to colorless waterproofing compositions and processes for producing them, to methods employing the compositions and to articles treated with the compositions. More particularly, the invention is directed to water-soluble, colorless complexes of aluminum with monocarboxylic acids of low water solubility.

I have now found that by effecting contact between a substantially non-aqueous solution of a basic ionizable salt of aluminum and a carboxylic acid of low water solubility, aluminum complexes of the Werner type are produced which are water-soluble, colorless, and which unexpectedly form stable, colloidal solutions when added to water. These colloidal solutions impart water-repellency and size to paper and fabrics.

In addition to imparting water-repellency and size to such substrates as paper and fabrics, aqueous solutions of the complexes of my invention can be used to treat any of a wide variety of surfaces, such as, for example, metals, clays, fillers, glass, asbestos, masonry, other ceramic materials, wood, cellulosic films, textile fibers, yarns, and the like, not only to give water-repellency but also to increase their compatibility with organic systems.

Additionally, I have found that the aluminum complexes of my invention, in contrast with the chromium complexes of the prior art, can be applied to surfaces at higher pH values and are more readily compatible with the surfaces at higher pH's. Further, the carboxylato aluminum complexes of the invention have substantial sizing action.

The complexes of this invention can be made from a variety of aluminum compounds. The aluminum, however, must be in the form of low molecular weight, substantially non-aqueous solution of a basic ionizable salt when it is contacted with the carboxylic acid.

A convenient method of preparing my complexes is by reacting an aluminum ester, such as, for instance, aluminum isopropoxide with predetermined amounts of acid and water. In general, it is preferable to use an anhydrous acid such as, for instance, hydrochloric acid and a controlled amount of water. More will be said later about water control.

The reaction can be carried out satisfactorily in alcohols such as the lower aliphatic alcohols, preferably, n-propanol, ethanol, or in other organic solvents such as, for instance, carbon tetrachloride. Alternatively, the acid and water can be added to the reaction vessel with the carboxylic acid used to form the complex.

The proportions of ester, acid, and water are chosen such that the aluminum compound will have the formula (1) $Al(OH)_nX_{3-n}$ said formula representing one of the products of the following reaction:

$$Al(OR)_3 + (3-n)HX + nH_2O \rightarrow Al(OH)_nX_{3-n} + 3ROH$$

In the above formula and equation, X represents the anion of an acid which will form an ionizable basic salt of aluminum, R represents a lower alkyl group, preferably isopropyl or ethyl, and $n$ is any quantity greater than zero but not more than 2.5.

A compound of Formula 1 is a basic aluminum salt with a basicity of less than 2.5/3.0 or 5/6. The preferred compounds of Formula 1 have basicity range of from ⅓ to ⅔. In other words, the preferred basic aluminum salts have formulae of $Al(OH)X_2$ to $Al(OH)_2X$.

The basic aluminum salt used in the process of preparing the compositions of the invention can also be obtained by reaction of an aluminum ester with an anhydrous aluminum salt. Such reaction may be illustrated as follows:

$$2Al(OR)_3 + AlCl_3 + 6H_2O \rightarrow 3Al(OH)_2Cl + 6ROH$$

The above shown reaction is best effected in an organic solvent such as, for instance, carbon tetrachloride or isopropanol, and may be performed simultaneously with the reaction with the carboxylic acid.

Still another method of obtaining a basic aluminum salt of Formula 1 is by azeotropic dehydration of a hydrated aluminum salt with an alcohol. Thus, by distillation of a mixture of aluminum chloride hexahydrate in n-propanol, water can be removed as well as hydrochloric acid and an anhydrous solution of a basic aluminum chloride in n-propanol is obtained.

Aqueous solutions of more basic aluminum salts such as $Al(OH)Cl_2$ can likewise be dehydrated by azeotropic distillation to give a more basic aluminum salt in substantially anhydrous alcoholic solution.

It will be understood that still other processes may be used for preparing a substantially non-aqueous solution of a low molecular weight, ionizable basic aluminum salt. Such a solution may be prepared for instance by contacting an alcoholic solution of aluminum chloride with an anion exchange resin in the hydroxyl form, or by adding an anhydrous base to an alcoholic solution of an aluminum salt, or by reacting an aluminum oxide or hydrous aluminum oxide with an anhydrous acid or aluminum salt.

The salt of the basic aluminum ion can be any salt ionizable in aqueous solution. Illustrative of such salts are chlorides, bromides, chlorates, iodides, nitrates, acetates, formates, and the like. For convenience and economy the chloride salt is generally preferred.

The carboxylic acids used to prepare the novel compositions of this invention are monocarboxylic acids which have a solubility in water at 20° C. of less than 1%; that is to say, less than one gram of the carboxylic acid will be dissolved in 100 grams of water at 20° C. For the development of maximum water-repellency on substrates, compositions prepared from saturated long chain aliphatic acids such as for instance, myristic, palmitic and stearic, and perfluoro acids such as perfluorobutyric acids are preferred.

It will be understood that the carboxylic acids used in the process of the invention can be unsaturated, branched chained, aromatic or carbocyclic. They may contain polar groups. It is essential, however, that the acid is one of low aqueous solubility, that is, less than 1% at 20° C.

Illustrative, but in no way limitative, of the carboxylic acids which have an aqueous solubility less than 1% at 20° C. there may be mentioned the following groups:

(1) Saturated normal fatty acids having more than 7 carbon atoms, such as, capric, undecoic, lauric, tridecoic, myristic, pentadecoic, palmitic, margaric, stearic, nondecoic, arachidic, heptanoic, caprylic, pelargonic.

(2) Olefinic carboxylic acids with more than 10 carbon atoms such as undecylenic, myristelenic, palmitolenic, oleic, linoleic, linolenic, elaeostearic, clupanodonic and chaulmoogric.

(3) Carboxylic acids having a branched carbon chain such as 2-ethylhexanoic acid.

(4) Aromatic or carbocyclic carboxylic acids such as benzoic, abietic, alpha-phenylpropionic, beta-phenylpropionic, methoxybenzoic (ortho-, meta-, and para-), toluic acid (ortho-, meta-, and para-), p-isopropylbenzoic and alpha- and beta-naphthoic acids.

(5) Monocarboxylic acids containing substituted polar groups such as perfluorobutyric acid, perfluorooctanoic acid, perchlorocaprylic acid, alpha-aminocaprylic acid, alpha-hydroxycaprylic acid, alpha-hydroxy stearic acid, perfluorocyclohexanecarboxylic acid, nitrobenzoic acid (ortho-, meta-, and para-), nitrocinnamic acid (ortho-, meta-, and para-), and p-nitrophenylacetic acid.

Among the monocarboxylic acids containing substituted polar groups which can be used to advantage in the process of the invention are the halogenated carboxylic acids of the formula (2)   $R'(CX_2)_nCOOH$ where $R'$ is a member of the group consisting of hydrogen, trifluoromethyl and chlorodifluoromethyl, X is a halogen of the group consisting of fluorine and chlorine, $n$ is a positive integer of at least 4, with the proviso that (a) when $R'$ is trifluoromethyl all of the halogen atoms must be fluorine, (b) when $R'$ is chlorodifluoromethyl at least two-thirds of the halogen atoms must be fluorine, and (c) when $R'$ is hydrogen at least half of the halogen atoms must be fluorine and $n$ must be divisible by 2.

Illustrative of some of the useful halogenated carboxylic acids of Formula 2 there may be named Perfluorohexanoic acid
Dodecafluoroheptanoic acid
Hexadecafluorononanoic acid
Eicosafluoroundecanoic acid
Tetracosafluorotridecanoic acid
Tridecafluoroheptanoic acid
Heptadecafluoropelargonic acid
Nonadecafluorocapric acid
Heneicosafluoroundecoic acid
Tricosafluorolauric acid
Pentacosafluorotridecoic acid
Heptacosafluoromyristic acid
Nonacosafluoropentadecoic acid
Hentriacontafluoropalmitic acid
Tritriacontafluoromargaric acid
Pentatricontafluorostearic acid
Dotriacontafluoroheptodecanoic acid
Tetracontafluoroheneicosanoic acid
Octafluorooctachlorononanoic acid
Hexafluorohexachloroheptanoic acid
Alpha, alpha, beta, gamma, gamma, delta, epsilon, epsilon-octafluoro-beta, gamma, epsilon-trichlorohexanoic acid
Alpha, alpha, beta, gamma, gamma-pentafluoro-beta, gamma-dichlorobutanoic acid The preparation of perfluorocarboxylic acids of the formula (3)   $CF_3(CF_2)_nCOOH$ where $n$ is at least 4, preferably 4 to 11, which can be used in the manufacture of the compounds of the invention, is described by W. H. Pearlson on pages 478–480, of J. H. Simons' "Fluorine Chemistry," vol. 1, Academic Press Inc., N. Y. (1950). The electrochemical process most generally used is described by Simons et al. in J. Electrochem. Soc. 95, 59 and in United States Patent 2,519,983. Fluorocarbon monocarboxylic acids having at least 4 carbon atoms are described and claimed in U. S. Patent 2,567,011 which issued to A. H. Diesslin et al. on September 4, 1951. Several of the perfluorocarboxylic acids of Formula 3, as well as the chlorodifluoromethyl carboxylic acids of Formula 2 (proviso (b)), are commercially available.

The preparation of the omega-hydrogen fluorinated acids of the formula (4)   $H(CX_2CX_2)_nCOOH$ wherein the X substituents are halogen atoms having an atomic weight of less than 40 of which at least half in each $CX_2CX_2$ group are fluorine atoms and $n$ is an integer of at least 2, which can be used in the manufacture of the compounds and compositions of this invention; is fully described and claimed in U. S. Patent 2,559,629. The fluoroalcohols which are oxidized to give the acids of Formula 3 are fully described and claimed in U. S. Patent 2,559,628. Preferred compounds of Formula 4 for purposes of this invention are those in which X is fluorine and $n$ is 3 to 7.

The reaction of the carboxylic acid with the basic aluminum salt can be carried out in any non-aqueous medium in which the two compounds are mutually soluble such as, for instance, in ethanol, n-propanol, isopropanol, butanol, a chlorinated hydrocarbon, for example, carbon tetrachloride. The reaction is generally complete after the reactants have remained in contact with each other for a period of about twenty-four hours at a temperature of about 20° C. When the temperature of the reactants is raised to about 100° C., the complex is formed in about 30 minutes or less.

In those instances where one of the reactants is only slightly soluble in the non-aqueous medium, the other reactant which is in solution, can be left in contact with the slightly soluble solid compound until such time as the reaction is complete and the complex is in true solution. Such completion may take several days.

It is essential that the water content of the medium in which complex formation is carried out be kept low. It is preferred that the water content be such that the total number of water molecules, hydroxyl ions, ionizable anions, and carboxylic acid anions combined be less than 6 per aluminum atom. If more water is present the efficiency and rate of complex formation are substantially reduced.

The molar ratio of aluminum to carboxylic acid in the complexes of this invention can vary from about 1:1 to 10:1, preferably from 1:1 to 2:1. Complexes having ratios outside these limits are less soluble below 1:1 or much less effective above 10:1.

The aluminum complexes of the present invention are best obtained in aqueous solution by adding an alcoholic solution of the complex to water. The alcoholic solution and the water are thoroughly mixed. The alcoholic solution can be prepared directly or by dissolving the solid complex in the alcohol.

Aqueous solutions of the aluminum-carboxylic acid complexes of the present invention, which normally contain at least 0.5% of an alcohol arising from the alcohol in which the complex is dissolved, can be partially neutralized by the addition of dilute alkali, ammonia or other base.

The surface to be treated with the complex can be immersed or suspended in the aqueous solution, removed therefrom and dried, preferably at about 100° C. to cure or insolubilize the complex on the surface.

The aluminum complexes of this invention offer unique advantage in that they can be made less acidic than any of the chrome complexes of the prior art. In addition, the aluminum complexes may be partially neutralized to a higher pH than the chromium complexes. Aqueous solutions at pH 6 have been obtained by neutralization of the stearato aluminum chloride complex with dilute ammonium hydroxide.

Partial neutralization of the aluminum complexes of the invention can also be accomplished by contacting with an anion exchange resin in the hydroxyl form.

Since, as already indicated, the aqueous solution of the aluminum complex has a higher pH than a similar solution of a corresponding chrome complex, there is a distinct advantage to using an aluminum complex on fabric since a fabric so treated is not weakened to the extent fabrics are when they are treated with a chrome complex. This difference between aluminum complexes and chrome complexes on the tenderizing of fabrics has been convincibly demonstrated by preparing isopropanol solutions of an aluminum complex and a chrome complex containing exactly the same molar concentration of metal, chloride ion and myristic acid (wt. percent myristic acid equal 11.8). Equal amounts of these two solutions were diluted with water and used to treat samples of white cotton cloth. After the samples were dried, the force required to tear a strip of the aluminum complex treated cloth on the "Elmendorf Tear Tester" was 3360 gms. A force of only 2370 gms. was required to tear the cloth treated with the chrome complex.

Another outstanding advantage of the aluminum complexes of the present invention is their stability in isopropanol and in aqueous solutions.

Isopropanol solutions of aluminum complexes of my invention are very stable as well as being colorless. For example, an isopropanol solution stored in an oven for 90 days at 45° C. showed no sign of decomposition. Samples have also been stored at room temperature for over two years with no sign of decomposition. In contrast, an isopropanol solution of a chrome complex containing the same molar concentration of metal, chloride and stearic acid began to form a precipitate after only twenty days at an average temperature of 24° C. The presence of a precipitate in the isopropanol solution is a distinct disadvantage in commercial use since special provisions must be made to filter this solution before use. In addition, such precipitation results in a loss of active ingredient.

Aqueous solutions of an aluminum complex of the present invention generally have a pH of about 4.2 and are stable for more than a week when prepared as described herein. The corresponding aqueous solutions of the chrome complexes have pH's of about 2.5. When this pH is increased to 4.2 with a commercial neutralizer recommended for this use, the resulting solution begins to form a copious precipitate in less than a day. This precipitation removes active ingredient from solution and decreases the effectiveness of it as a waterproofing agent. It is, of course, highly impractical to treat fabric or cloth with a solution containing a precipitate, since solid particles are deposited on the surface of the treated article, ruining its appearance.

The water-soluble, colorless waterproofing compositions of my invention are complex compounds of the Werner type and are not to be confused with the normal aluminum salts. Thus, a complex composition of my invention with a carboxylic acido group, for example, a stearato group, differ radically in chemical compositions from the normal aluminum stearates, as is clearly evident from the fact that normal aluminum stearate is insoluble in water. It is possible to explain such observed differences in properties on the basis of structure rather than empirical composition, and Werner's theory of complex compounds affords a convenient and logical basis for such an explanation.

A discussion of the Werner theory and its application to chromium compounds is fully described in United States Patent 2,273,040, which issued to Ralph K. Iler on February 17, 1942. The discussion therein set forth is also applicable to the aluminum complexes.

In order that the invention may be more fully understood, reference should be had to the following illustrative examples:

*Example 1*

As a source of basic aluminum chloride, an aqueous solution of a composition having the formula $Al(OH)Cl_2$ was prepared by reacting 241 parts of aluminum chloride hexahydrate in 1000 parts of water with 13.5 parts of aluminum metal at a temperature of 90° C. The resulting solution containing 14% $Al(OH)Cl_2$ was dehydrated by azeotropic distillation with n-propanol. This product was a clear colorless propanol solution of a basic aluminum salt of the composition $Al(OH)_{2.3}Cl_{.7}$ (7.36% $Al_2O_3$, 3.60% Cl, and 0.5% $H_2O$).

The following ratios of the above solution and stearic acid were mixed and diluted to 100 parts with n-propanol:

| Basic Aluminum Chloride Solution, parts | Stearic Acid, parts | Acid/Metal |
|---|---|---|
| 17.6 | 7.0 | 1:1 |
| 27.0 | 5.4 | 1:2 |
| 33.0 | 4.4 | 1:4 |

The solutions were warmed to dissolve the stearic acid and allowed to stand for a period of twenty-four hours to complete reaction. The products are clear, colorless solutions of aluminum-stearic acid complexes, or, using the type of nomenclature described in the aforementioned Iler patent, solutions of stearato aluminum chlorides.

On dilution with water these complexes gave stable, opalescent, colloidal solutions which imparted water repellency to paper and fabrics simply by dipping the paper or fabric in the aqueous solution and drying the treated material at 100° C. for a period of five minutes. The treatment imparted size to the unsized paper. The improvement in size was observed by the very slow water absorption under a heavy stream of water.

The aqueous solutions of pH about 4 could be partially neutralized with ammonium hydroxide, up to pH 6, without the separation of any precipitate.

*Example 2*

A less basic salt than that employed in Example 1 was prepared by reacting 2.88 parts of anhydrous aluminum chloride with 100 parts of the basic aluminum chloride solution in propanol prepared in the manner described in Example 1. The resulting solution contained 15.6% $Al(OH)_2Cl$.

The following ratios of this solution and palmitic acid were mixed and diluted to 100 parts with normal propanol.

| $Al(OH)_2Cl$ Solution, parts | Palmitic Acid, parts | Acid/Metal |
|---|---|---|
| 24 | 5 | 1:2 |
| 48 | 5 | 1:4 |

These solutions were warmed to dissolve the palmitic acid and allowed to stand for a period of twenty-four hours whereupon the reaction was complete. The products were clear colorless solutions of aluminum-palmitic acid complexes.

The products of this example gave stable, colloidal solutions in water. The aqueous solutions imparted water-repellency and size to paper and cellulosic and synthetic fabrics.

*Example 3*

A basic aluminum chloride salt was prepared by reacting 12.5 parts of anhydrous aluminum chloride in 50 parts of normal propanol with 50 parts of the basic aluminum chloride solution in propanol prepared in the manner described in Example 1. The resulting solution contained 17% of $Al(OH)Cl_2$.

The ratios of this solution and palmitic acid which were mixed and diluted to 100 parts with normal propanol are shown below.

| Al(OH)Cl$_2$ Solution, parts | Palmitic Acid, parts | Acid/Metal |
|---|---|---|
| 13 | 5 | 1:1 |
| 26 | 5 | 1:2 |
| 53 | 5 | 1:4 |

The solutions were warmed to dissolve the palmitic acid and allowed to stand for a period of twenty-four hours to complete reaction. The products are clear, colorless solutions of aluminum-palmitic acid complexes.

The products gave stable, colloidal solutions in water. These solutions imparted water-repellency in size to paper and to a variety of yarns and fabrics, particularly those having negatively charged surfaces.

*Example 4*

To 27 parts of the basic aluminum chloride solution in propanol described in Example 1, there was added 4.6 parts of myristic acid. This mixture was diluted to 120 parts with isopropanol. A portion of the isopropanol acid solution was refluxed for thirty minutes and another portion just warmed to dissolve the acid and allowed to stand twenty-four hours. Both solutions gave stable colloidal solutions on dilution with water.

These aqueous solutions imparted water-repellency and size to paper and fabrics.

*Example 5*

Aluminum isopropoxide, 4.08 parts, was dissolved in 50 parts of carbon tetrachloride. This solution was added to a solution of 4.26 parts of stearic acid in 40 parts of carbon tetrachloride containing in suspension 1.33 parts of anhydrous aluminum chloride and 0.81 part of water. The resulting mixture, containing aluminum/chloride/stearic acid molar ratio of 1/1/½, was allowed to stand for a period of two days. At the end of this period all of the aluminum chloride had reacted. The carbon tetrachloride was then removed from the reaction product by evaporation at 50° C. and in a vacuum of 30 millimeters of mercury.

The resulting aluminum complex was a glassy clear, slightly yellow solid. It dissolved readily in normal propanol. A propanol solution containing 0.3 part of the complex was added with stirring to 100 parts of water to give a colorless, opalescent solution.

Sheets of both sized and unsized paper and a piece of cotton fabric were treated with this solution. The treated materials were dried in an oven at a temperature of 100° C. The treated paper and fabric were water-repellent. They gave complete roll off under continued bombardment with droplets of water. Under a steady stream of water the unsized paper did not become translucent in five minutes. This indicates the excellent sizing action of the complex.

Ten parts of kaolin clay was treated with 50 parts of an aqueous solution of the above complex. The treated clay was filtered off and dried at a temperature of 100° C. The dried clay was hydrophobic, but dispersed readily in toluene. The untreated clay dispersed readily in water but not at all in toluene.

The above described complex may also be prepared directly in alcohol solution either by reaction of aluminum isopropoxide, aluminum chloride, stearic acid, or aluminum isopropoxide, anhydrous hydrochloric acid, and stearic acid. In both cases water must be added in the amounts required to complete hydrolysis of the aluminum isopropoxide.

*Example 6*

A solution of 0.533 N hydrogen chloride in isopropanol (484 ml.; 0.258 mole) was placed in a bottle equipped with a magnetic stirrer. Ground aluminum isopropoxide (26.4 gm.; 0.129 mole) and perfluorooctanoic acid (53.4 gm.; 0.129 mole) were then added. After the reaction mixture was stirred for 2 hours, the weight of the resulting clear solution was adjusted to 500 gm. with isopropanol.

Paper and fabric articles were rendered both water and oil repellent when treated with the aqueous solution obtained by adding the above isopropanol solution of the aluminum-perfluorooctanoic acid complex to water.

*Example 7*

A solution of 2.35 N hydrogen chloride in isopropanol (55 ml.; 0.129 mole) was placed in a bottle equipped with a magnetic stirrer. Perfluorohexanoic acid (20.25 gm.; 0.0645 mole) and 50.0 gm. of a 52.5 wt. percent solution of aluminum isopropoxide in isobutanol (equal to 0.129 mole of aluminum isopropoxide) were then added. After the reaction mixture was stirred for one and one-half hours, enough water was added to it to complete the hydrolysis of the aluminum isopropoxide, and the weight of the product was adjusted to 125 gm. with isopropanol.

Paper was made water repellent when treated with the aqueous solution obtained by diluting the above isopropanol solution of the complex with water.

*Example 8*

A solution of 2.35 N hydrogen chloride in isopropanol (110 ml.; 0.258 mole) was placed in a bottle equipped with a magnetic stirrer. Alhpa, alpha, beta, gamma, gamma, delta, epsilon, epsilon, zeta, eta, eta-undecafluoro-beta, delta, zeta, eta-tetrachlorooctanoic acid (31 gm.; 0.0645 mole) and 30 gm. of a 52.5 wt. percent solution of aluminum isopropoxide in isobutanol (equal to 0.129 mole of aluminum isopropoxide) were then added. After the reaction mixture is stirred for one and one-half hours, enough water was added to it to complete the hydrolysis of the aluminum isopropoxide. The weight of the product was adjusted to 250 gm. with isopropanol.

Paper was made water repellent when treated with the aqueous solution obtained by diluting the above isopropanol solution of the complex with water.

*Example 9*

A solution of 2.35 N hydrogen chloride in isopropanol (12.4 ml.; 0.029 mole) was placed in a bottle equipped with a magnetic stirrer. Omega-hydroperfluorooctanoic acid (5.72 gm.; 0.0145 mole) and 11.2 gm. of a 52.5 wt. percent solution of aluminum isopropoxide in isobutanol (equal to 0.029 mole aluminum isopropoxide) was then added. The reaction mixture was stirred for one hour. Enough water was added to the mixture to complete the hydrolysis of the isopropoxide. The weight of the product thus prepared was adjusted to 28 gm. with isopropanol.

Paper was made water repellent when treated with the aqueous solution obtained by diluting the above isopropanol solution of the aluminum-omega-hydroperfluorooctanoic acid complex with water.

*Example 10*

A solution of 1.92 N hydrogen chloride in isopropanol (134.4 ml.; 0.258 mole) was placed in a bottle equipped with a magnetic stirrer. Myristic acid (29.4 gm.; 0.129 mole) and 100 gm. of a 52.5 wt. percent solution of aluminum isopropoxide in isobutanol (equal to 0.258 mole of aluminum isopropoxide) were then added. After the reaction mixture was stirred for one hour, enough water was added to complete the hydrolysis of the aluminum isopropoxide and the weight of the product so obtained was adjusted to 250 gm. with isopropanol. (This gave a solution containing 11.8 wt. percent myristic acid.) A small amount of undissolved solids can be removed by decantation or filtration.

Paper and fabric articles were rendered water repellent when treated with the aqueous solution obtained by diluting the above alcoholic solution of the aluminum complex of myristic acid with water.

Light scattering data on an aqueous solution of an aluminum complex of myristic acid prepared by a procedure substantially identical to that described in above Example 10 indicated that the complex contained particles having a minimum diameter of 0.16 micron. For purposes of calculation it was assumed that the particles were spherical. The aqueous solution used in this light scattering work was prepared by adding 28.9 ml. of alcoholic solution of the aluminum complex below the surface of 971 ml. of water. The water was slowly agitated throughout the addition.

Preparation of the aqueous solution of the aluminum complex by addition of the alcoholic solution (containing 11.8 wt. percent myristic acid) as such to water may be difficult under some commercial conditions. A slow rate of addition and relatively efficient agitation should be employed. However, if the alcoholic solution is diluted with additional alcohol or ketone—preferably one to two parts by weight—the rate of addition to water can be increased appreciably.

The alcohols which can be used for such dilution purposes are lower aliphatic alcohols having 5 or less carbon atoms, preferably 1 to 3 carbon atoms. Any of the lower aliphatic ketones ($C_3$–$C_{11}$), preferably 3–5, can be used. Particularly preferred diluents are methanol and acetone.

It is believed that any low molecular weight organic compound that is soluble to the extent of 20 wt. percent in water and is stable in the isopropanol solution of the aluminum complex will have some beneficial effect on the ease of preparation of the aqueous solution of the aluminum complex.

The beneficial effect of methanol as a diluent can be illustrated by reference to an aluminum complex of myristic acid (11.8 wt. percent), prepared according to Example 10. The complex was diluted with two parts by weight of methanol and then poured rapidly into 376 gms. of water. The mixture was agitated. The resulting slightly opalescent solution was stable for more than a week. A similar experiment was performed using undiluted complex. Addition of this undiluted material to water gave a mixture containing a large amount of amorphous precipitate.

This application is a continuation-in-part of my copending United States application Serial No. 418,231, filed March 23, 1954.

I claim:

1. A water-soluble, colorless composition comprising a complex compound of the Werner type in which trivalent nuclear aluminum atoms are coordinated with the acid group of a monocarboxylic acid, said acid having a solubility in water at 20° C. of less than 1%.

2. A water-soluble, colorless composition comprising a complex compound of the Werner type in which trivalent nuclear aluminum atoms are coordinated with the acid group of a monocarboxylic acid, said acid having a solubility in water at 20° C. of less than 1%, and the ratio of aluminum atoms to carboxylic acido groups being from about 1:1 to about 10:1.

3. A water-soluble, colorless composition comprising a complex compound of the Werner type in which trivalent nuclear aluminum atoms are coordinated with the acid group of a halogenated monocarboxylic acid, said acid having a solubility in water at 20° C. of less than 1%, and having the formula $$R(CX_2)_nCOOH$$

wherein R is a member of the group consisting of hydrogen, trifluoromethyl and chlorodifluoromethyl, X is a halogen of the class consisting of fluorine and chlorine, and $n$ is a positive integer of at least 4, with the proviso that (a) all of the halogen atoms must be fluorine when R is trifluoromethyl, (b) at least two-thirds of the halogen atoms must be fluorine when R is chlorodifluoromethyl, and (c) when R is hydrogen at least half of the halogen atoms must be fluorine and $n$ must be divisible by two, the ratio of aluminum atoms to carboxylic acido groups being from about 1:1 to about 10:1.

4. A composition as set forth in claim 3 wherein $n$ is a positive integer from 4 to 11.

5. A water-soluble, colorless composition comprising a complex compound of the Werner type in which a trivalent nuclear aluminum atom is coordinated with a stearato group.

6. A water-soluble, colorless composition comprising a complex compound of the Werner type in which a trivalent nuclear aluminum atom is coordinated with a perfluorooctanoato group.

7. A water-soluble, colorless composition comprising a complex compound of the Werner type in which a trivalent nuclear aluminum atom is coordinated with a palmitato group.

8. A water-soluble, colorless composition comprising a complex compound of the Werner type in which a trivalent nuclear aluminum atom is coordinated with a myristato group.

9. In a process for producing a composition of claim 1, the step comprising effecting contact between a low molecular weight, non-aqueous solution of a basic ionizable salt of aluminum with a monocarboxylic acid having a solubility in water at 20° C. of less than 1%.

10. In a process for producing a composition of claim 1, the step comprising effecting contact between a low molecular weight, non-aqueous solution of a basic ionizable salt of aluminum with a monocarboxylic acid having a solubility in water at 20° C. of less than 1%, said salt of aluminum having a basicity of less than about 83%.

11. In a process for increasing the hydrophobic and organophilic properties of a surface, the step comprising effecting contact of the surface with a complex compound of the Werner type in which a trivalent nuclear aluminum atom is coordinated with an acido group of a monocarboxylic acid having a solubility in water at 20° C. of less than 1%, whereupon said complex compound becomes adsorbed on the surface.

12. In a process for increasing the hydrophobic and organophilic properties of a negatively-charged surface, the step comprising effecting contact of the surface with a complex compound of the Werner type in which a trivalent nuclear aluminum atom is coordinated with an acido group of a monocarboxylic acid having a solubility in water at 20° C. of less than 1% and drying said surface to insolubilize the complex compound on said surface.

13. An article having hydrophobic and organophilic properties and characterized by the presence on its surface of an adsorbed coating of a composition of claim 1.

14. An article having hydrophobic and organophilic properties and characterized by the presence on its surface of an adsorbed coating of a composition of claim 3.

References Cited in the file of this patent

UNITED STATES PATENTS

| | | |
|---|---|---|
| 1,964,696 | Traube et al. | June 26, 1934 |
| 2,273,040 | Iler | Feb. 17, 1942 |
| 2,389,873 | Schiller | Nov. 27, 1945 |
| 2,567,011 | Diesslin et al. | Sept. 4, 1951 |
| 2,662,835 | Ried | Dec. 15, 1953 |